July 24, 1923.　　　　　　　　　　　　　　　　1,462,775
　　　　　　　A. TRIVELLONI
PROCESS FOR THE MANUFACTURE OF NAILS FORMED IN TWO PARTS
　　　　　　　　Filed Nov. 2, 1920

Inventor

Angelo Trivelloni,

By Emil Bönnelycke
　　　　　　Attorney

Patented July 24, 1923.

1,462,775

UNITED STATES PATENT OFFICE.

ANGELO TRIVELLONI, OF MILAN, ITALY.

PROCESS FOR THE MANUFACTURE OF NAILS FORMED IN TWO PARTS.

Application filed November 2, 1920. Serial No. 421,305.

*To all whom it may concern:*

Be it known that I, ANGELO TRIVELLONI, subject of the King of Italy, residing at Milan, Kingdom of Italy, have invented certain new and useful Improvements in Processes for the Manufacture of Nails Formed in Two Parts, of which the following is a specification.

The object of the present invention is a new and improved process for the manufacture of nails or studs of the type such as are used for studding the wearing surface of pneumatic tire covers, or for similar purposes, wherein the head or wearing portion of the stud is of a hard metal while the shank is of a softer metal.

Various processes are known for the production of nails or studs of this type, in some of which a head is first formed of a hard metal, or a metal capable of being hardened and a shank is formed of soft metal, the two formed parts being welded together, and if necessary the heads hardened afterwards by any suitable means.

According to the present invention, two suitable bars, one of hard and one of soft metal, are cut into suitable lengths, and lengths of each are welded together end to end and the joined piece forged or stamped so as to form a head of the whole of the hard metal or of the whole of the hard metal together with a part of the soft metal. Such a process can be both simply and readily carried out on a large scale, and the resulting product has a perfect cohesion so far as the joint between the two parts is concerned.

In welding, the pieces are placed in contact with one another at the point where they are required to join, and are then welded by any of the well known welding processes but preferably by the electrical autogenous welding process, by allowing the current to flow through the two pieces pressed together end to end.

The series of operations above described may, if desired, be reversed and the welding of the uncut pieces be effected first and the resulting heterogeneous pieces of metal cut off.

The accompanying drawing represents by way of example one method of carrying out the invention.

Figure 1:
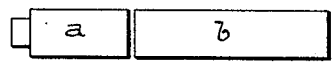
Fig. 1 shows two bars of metal, one, $a$, of mild metal and the other, $b$, of hard metal, arranged preparatory to being joined.
Figure 2:
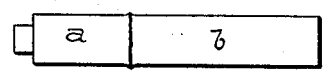
Fig. 2 shows the bars of metal welded together before being shaped to form a nail or stud.
Figure 3:
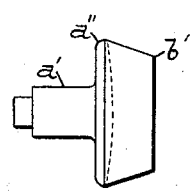
Fig. 3 shows a finished nail or stud, the part $b$ of the heterogeneous bar shown in Fig. 2 having been formed into a head $b'$ suitable for a non-slipping tire stud, and the shank $a'$ and the base $a''$ of the head being formed of the softer part $a$ (Fig. 2) of the original joined bar.

I claim as my invention:

An improved process for the manufacture of nails or studs of the type in which the head of the nail or stud is of a hard metal and is welded to a shank of softer metal, said process consisting in welding together end to end two suitable bars, one of hard metal and the other of soft metal, and then forging or stamping the joined piece so as to form a head of the whole of the hard metal.

In testimony whereof I affix my signature.

ING. ANGELO TRIVELLONI.